United States Patent [19]
Rotier et al.

[11] 3,824,464
[45] July 16, 1974

[54] PULSE DETECTION SYSTEMS

[75] Inventors: Donald J. Rotier, Saint Paul; Robert T. Sawamura, Minneapolis, both of Minn.

[73] Assignee: Honeywell Inc., Minneapolis, Minn.

[22] Filed: July 16, 1973

[21] Appl. No.: 379,378

[52] U.S. Cl. ............... 324/186, 328/115, 343/13 R
[51] Int. Cl. ....... G04f 11/06, H03k 5/20, G01s 9/06
[58] Field of Search .................. 324/181, 186, 188; 343/13 R; 328/115

[56] References Cited
UNITED STATES PATENTS

| | | | |
|---|---|---|---|
| 3,535,620 | 10/1970 | Johnston | 324/181 X |
| 3,543,270 | 11/1970 | Wiley | 343/13 R |
| 3,550,125 | 12/1970 | Fierston et al. | 324/188 X |
| 3,631,263 | 12/1971 | Graham et al. | 328/115 X |

Primary Examiner—Alfred E. Smith
Attorney, Agent, or Firm—Charles J. Ungemach; Albin Medved

[57] ABSTRACT

Pulse detection circuitry for accurately measuring the time for transmission of a train of acoustical energy pulses between a transmitter and receiver. One of the pulses has significantly greater amplitude than the other pulses in the train and has a negative-going zero crossing which occurs at a predetermined time in the pulse train. A peak detector and charge sensor is connected to the receiver. The signal from the receiver is also provided to a negative zero crossing detector which generates pulses to start a timer in response to each negative-going zero crossing. A peak detector and charge sensor also connected to the receiver detect when the pulse preceding a negative-going zero crossing is greater in amplitude than preceding pulses and reset the counter upon such detection. A data gate which increases system noise rejection is also disclosed.

9 Claims, 4 Drawing Figures

PULSE DETECTION SYSTEMS

BACKGROUND OF THE INVENTION

This invention relates generally to systems used to accurately detect the time of arrival of a pulsed signal at a receiver and more particularly concerns a system usable with ultrasonic ranging systems to accurately relate the time of arrival of an ultrasonic signal at a receiver to its time of transmission.

An example of the type of system in which the present invention might be applied is shown in U.S. Application Ser. No. 346,560 filed Mar. 30, 1973 and also assigned to the present assignee. That application discloses an ultrasonic line-of-sight determining system. The ultrasonic line-of-sight determining system has transducers on an observer's helmet and on a fixed reference object. From measurements of transit times for acoustical energy signals transmitted between the transducers on the reference object and the observer's helmet, the line-of-sight of the observer is calculated by the system. The pulse detection system described herein is usable for the purpose of accurately determining the time of arrival of pulses from the ultrasonic transmitter to an ultrasonic receiver even through a medium such as air, in which signal attenuation is substantial.

A number of difficult problems must be overcome by an effective pulse detection system. These problems include that of distinguishing between pulses received as a result of losses introduced in the medium, and of accurately measuring the arrival of a particular portion of a pulse or the pulsed signal and relating that measured arrival to the time of excitation or transmission from the transducer.

Therefore, it is an important object of the present invention to provide a pulse detection system which unambiguously detects a unique portion of a pulsed signal transmitted through a medium.

Another important object is to provide a pulse detection system which detects the arrival time of a unique portion of a pulsed signal at a signal receiver.

A more specific object is to provide a pulse detection system which detects the negative zero crossing of the largest amplitude pulse of a cyclic ultrasonic signal.

SUMMARY OF THE INVENTION

In accordance with the invention a signal comprised of a series of pulses separated successively by at least a predetermined time interval is received by means for producing a first signal whenever any pulse in the series crosses a predetermined reference level. The series of pulses is also received by reset means producing a second signal whenever a received pulse has a peak level exceeding that of the previously received pulses. Logic means are connected to receive the first and second signals and respond to simultaneous existence of the signals to generate a third signal. Finally, means responsive to the third and the second signals produce an output signal whenever the third signal is not followed by the second signal within the predetermined time interval between successive pulses.

BRIEF DESCRIPTION OF THE DRAWINGS

Other objects and advantages of the invention will become apparent upon reading the following detailed description and upon reference to the drawings, in which.

While the invention is described below in connection with a preferred embodiment, the invention is not limited in scope to that specific embodiment. On the contrary, all alternatives, modifications, and equivalents included within the spirit and scope of the invention defined by the appended claims are covered.

DETAILED DESCRIPTION OF THE INVENTION

Figure 1:
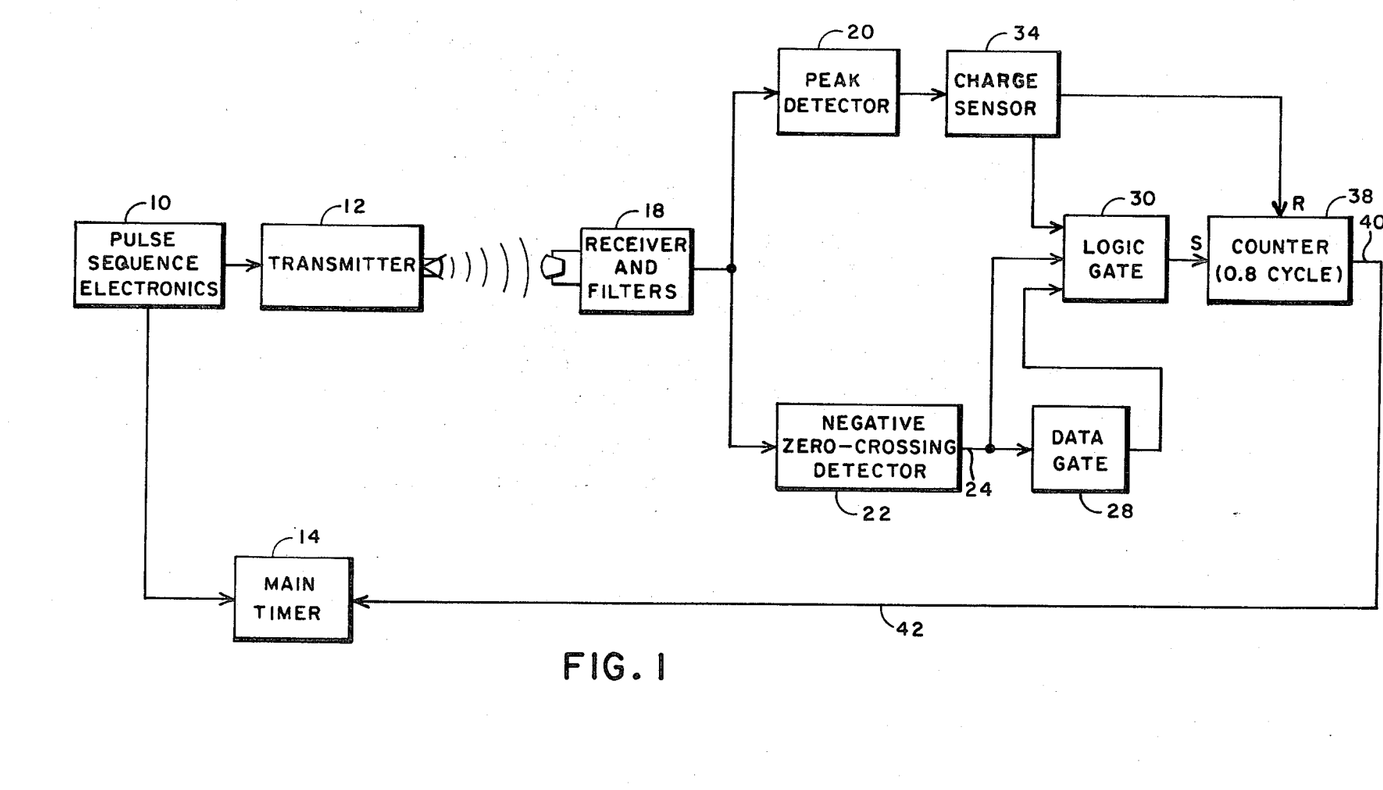
FIG. 1 is a functional block diagram showing the major elements of the pulse detection apparatus.

FIG. 1 is a functional block diagram containing the major elements of one embodiment of the invention. A pulse sequence electronics block 10 is shown connected to a transmitter 12 and a main timer 14. The pulse sequence electronics provides an excitation signal to transmitter 12 while also providing to main timer 14 a starting pulse coincident with the beginning of the excitation signal to transmitter 12. Transmitter 12 responds to the excitation signal to produce an output signal which may be a train of pulses of varying amplitude. Successive pulses in the output signal are separated by at least a predetermined time interval and, for the embodiment shown in FIG. 1, the output signal has a characteristic frequency. To the right of transmitter 12 are a number of arcs of concentric circles which represent the transmission of the pulsed signal through a transmission medium.

The pulsed signal is next received by receiver and filters 18. The received signal is bandpass filtered by receiver and filters 18 to eliminate noise and the filtered signal is presented at the inputs to a peak detector element 20 and a reference level crossing detector 22, which, in the specific embodiment of FIG. 1, is a negative zero crossing detector. Reference level crossing detector 22 analyzes the received signal and detects each excursion of the signal through a predetermined reference level in a particular direction, if that excursion has been preceded by a peak amplitude above a certain arm or threshold level. In FIG. 1, detector 22 is shown as a negative zero crossing detector. Thus, for the specific embodiment shown there, the reference level is zero and excursions through the zero level in a negative-going direction are detected when they are preceded by a peak amplitude above a certain arm level. Detector 22 generates narrow pulses whose leading edge is coincident with the negative-going zero crossing. The pulses generated by negative zero crossing detector 22 appear at an output 24 for transmission to the remainder of the system. The pulses at output 24 are provided to the imput of a data gate 28 and also as one input to a logic means or gate 30.

Data gate 28 responds to each pulse from output 24 to generate a corresponding pulse delayed by a predetermined time interval. The corresponding pulse will preferably be delayed so that it is centered in time about that point in time when the next pulse from output 24 would be expected. In other words, data gate 28 will generate output pulses delayed so that their centers occur one period of the transmitter output signal after the zero crossing detector output pulses which produce them. The pulses from data gate 28 may then be ANDed with the negative zero crossing detector output pulses to ensure that they represent zero crossings of the output signal rather than noise. Data gate 28 effectively produces a small time window in which the next negative zero crossing detector pulse must occur in order to be used by the system. The output pulses from data gate 28 are provided as a second input to logic gate 30.

Peak detector 20 functions to detect whether the magnitude of a pulse is larger than the magnitude of all preceding pulses in the output signal received. It accomplishes this function by storing a value of current related to the peak amplitude of the signal received and increasing that stored value each time a higher peak occurs. Peak detector 20 is connected to a charge sensor 34. Charge sensor 34 provides the current stored by peak detector 20 and develops pulses each time current is needed for storage by peak detector 20. This corresponds to each time a greater amplitude pulse is received by peak detector 20.

The output pulses of charge sensor 34 are provided to two other elements; the third input of logic means 30 and the R or reset input of a counter 38. Counter 38 is a conventional counter which has its "S" or start input connected to the output of logic gate 30. Counter 38 may be started by a leading edge of a pulse from the output of logic means 30. Counter 38 is chosen so that it will overflow or reach its capacity $t_0$ somewhat less than one period of the transmitted signal after being started. On the other hand, its capacity must be sufficiently large to allow the next succeeding pulse to reset the counter before overflow if the next succeeding pulse is greater in amplitude than previous pulses.

Counter 38 has an output 40. If counter 38 is started by a pulse from logic means 30 and allowed to run to its capacity, e.g. for a time $t_0$, without having been reset by a pulse at its R input from charge sensor 34, then an overflow pulse or timing signal will be provided to output 40.

Connected to output 40 is a signal transmission means 42 for transmitting the signal from output 40 to main timer 14. The signal transmitted from output 40 to main timer 14 stops timer 14. From the time now stored in main timer 14, the transmission time between transmitter 12 and receiver and filters 18 may be easily calculated.

Figure 2:
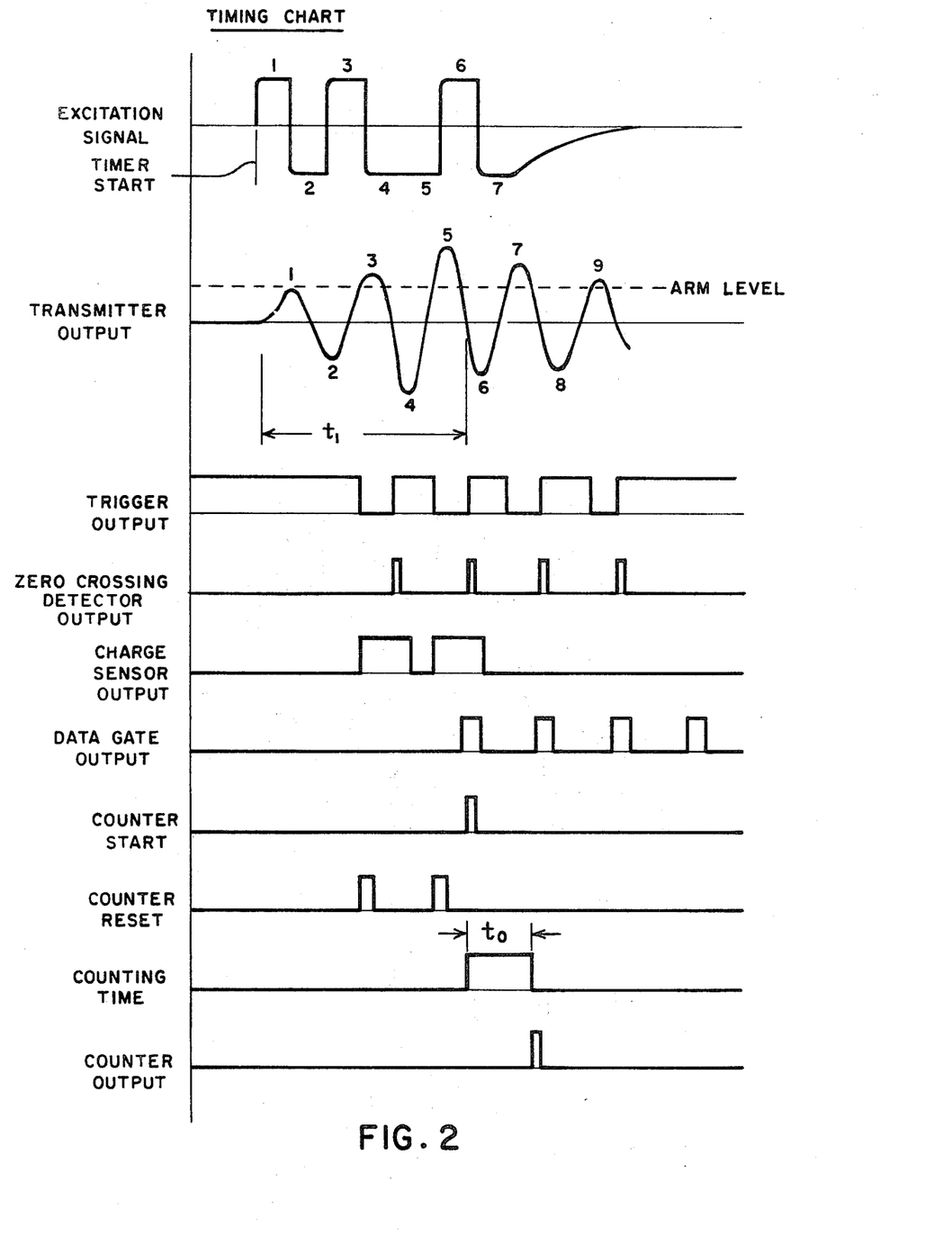
FIG. 2 is a timing chart showing representative signals from one embodiment of the invention as shown in FIG. 1.

Referring now to FIG. 2, a timing chart is shown which aids in illustrating the operation of the system shown in block diagram form in FIG. 1. For the purpose of this explanation, assume that transmitter 12 is an ultrasonic acoustical energy transmitter, while receiver and filters 18 includes an ultrasonic acoustical energy receiver. At the top of FIG. 2 is a waveform labelled "Excitation Signal." This represents an excitation signal which might be applied to transmitter 12 by the pulse sequence electronics. The half cycles of this excitation signal are numbered. Pulse sequence electronics 10 provides a start pulse simultaneous with the leading edge of the excitation signal to timer 14. In other words, pulse sequence electronics 10 provides a start pulse timed to be synchronous with the excitation signal sent to transmitter 12.

It should be noted that the excitation signal is characterized by four half cycles of a particular frequency followed by three half cycles at the same frequency but 180° out of phase with the first four cycles. For the specific embodiment discussed above, these last three half cycles were used to damp out the response of an ultrasonic transducer to the first four. The second waveform shown in the timing chart is the response of transmitter 12 to the excitation signal. The transmitter output has a frequency equal to that of the excitation signal but lags the excitation signal in phase. The transmitter output builds up to a maximum amplitude in half cycle 5 and then damps out due to out of phase excitation and system losses. In order to accurately measure the time of transmission between transmitter 12 and receiver and filters 18, some uniquely identifiable portion of this signal must be detected by receiver and filters 18 and its associated circuitry. For the specific embodiment of the pulse detection system shown in FIG. 1 the negative-going zero crossing of the largest positive amplitude half cycle has been selected as this portion. This particular negative-going zero crossing occurs at a predetermined and repeatable time with respect to the leading edge of the excitation signal. The predetermined time between the leading edge of the excitation signal and the negative-going zero crossing of the fifth half cycle is labelled $t_1$ in FIG. 2. The output of receiver and filters block 18 is not shown in FIG. 2, since it is substantially the same as the transmitter output waveform except for an overall reduction in intensity due to medium losses and the addition of noise picked up by the receiver.

The third waveform in FIG. 2 represents a signal internal to negative zero crossing detector 22. This signal is generated by a first portion of negative zero crossing detector 22, which includes a trigger circuit which changes state each time the signal from receiver and filters 18 has excursions above a predetermined threshold or arm level and subsequently passes through the zero level in a negative-going direction. The threshold or arm level which must be exceeded before state changes of the trigger output occur is selected high enough to prevent nuisance triggering in detector 22 in response to typical background noise levels about the receiver.

Within negative zero crossing detector 22 and connected to receive the trigger output, is a conventional differentiator circuit which generates a narrow pulse in response to each positive-going change of state of the trigger output. The differentiator pulses therefore coincide with the negative zero crossings of the receiver output signal. The fourth waveform, labelled "zero crossing detector output," shows the output of the differentiator portion of detector 22.

The fifth waveform shown represents the output for charge sensor 34 in response to a received signal of the type labelled "transmitter output" in FIG. 2. Peak detector 20 and charge sensor 34 in combination sense the amplitudes of the positive half cycles from receiver and filters 18 and increase the charge on a resistor-capacitor pair each time the amplitude of a positive half cycle significantly exceeds that of the preceding positive half cycles. Half cycle 3 of the transmitter output is the first half cycle to exceed the arm level. In response to half cycle 3, sensor 34 charges a capacitor, at the same time producing a charge sensor output pulse which indicates that charging has occurred. Half cycle 5 is significantly greater in amplitude than half cycle 3. When the amplitude in half cycle 5 exceeds the peak amplitude of half cycle 3, further charging occurs and a second pulse is produced at the charge sensor output. Since half cycle 7 is of lesser amplitude, no charging of the capacitor occurs and therefore no charge sensor output pulse is generated in response to it.

The sixth waveform of FIG. 2 is labelled "data gate output". Date gate 28 in FIG. 1 receives the zero crossing detector output pulses. In response to each pulse received gate 28 generates a corresponding pulse delayed so that it is centered in time about a point in time one period of the transmitter output after the zero crossing detector output pulse. The pulse generated by gate 28 should therefore be coincident with the next succeeding zero crossing detector output pulse.

As shown in FIG. 1, the outputs of charge sensor 34, negative zero crossing detector 22, and data gate 28 are all provided as inputs to logic means 30 whose output supplies counter 38 with a start pulse. Logic means 30 supplies a start pulse at its output when pulses are simultaneously present at all of its inputs. In a typical application using positive true logic, a three-input AND gate could be used as logic means 30. If negative true logic were selected for the system a NAND gate could be used. Half cycle 3 of transmitter output will not result in a start pulse from logic means 30 because the input connected to data gate 28 will not receive a pulse simultaneous with the charge sensor and negative zero crossing detector pulses. In response to half cycle 5, however, the data gate output, the charge sensor output, and the zero crossing detector output have coincident pulses. In response to these coincident pulses, logic means 30 will produce a pulse for starting the counter. The output of logic means 30, including the start pulse, appears as the seventh waveform in FIG. 2, and is labelled "counter start."

The start pulse starts counter 38. Counter 38 is built to have a capacity of approximately 0.8 period of the transmitter output signal. The selection of this capacity permits counter reset by charge sensor 34 before counter overflow occurs if the succeeding half cycle has an amplitude greater than that of the half cycle which started the counter.

The eighth waveform shown in the timing chart represents counter reset pulses provided to the "R" or reset input of counter 38 by charge sensor 34. The counter reset pulses are essentially coincident with the charge sensor output pulses but of shorter duration. These reset pulses occur each time a positive half cycle of greater amplitude than any previously received half cycle of the transmitter output signal sensed by the system. Since the object of the system is to detect the negative zero crossing of the largest amplitude pulse, counter reset is required each time a larger amplitude pulse is detected.

The ninth waveform shows the counting time or capacity of counter 38. Its length is labelled $t_0$, the counter capacity. When the counter reaches its capacity, an overflow pulse or timing signal is provided at the counter output. The overflow pulse is the final or tenth waveform shown in FIG. 2 and is a pulse which occurs when the counter capacity is exceeded. The overflow pulse is then transmitted from counter 40 via transmission means 42 to main timer 14 where it is used to stop main timer 14. At this point in time, main timer 14 has stored within it the time required for transmission of the signal between transmitter and receiver plus $t_1$, the time between the leading edge of the excitation signal and the negative zero crossing of the largest amplitude positive half cycle, and $t_0$, the capacity of counter 38. Since $t_1$ and $t_0$ are predetermined quantities, they can be easily subtracted by other system elements to obtain an accurate signal transmission time between transmitter 12 and receiver and filters 18.

The operation of the system of FIG. 1 will now be briefly summarized using the timing chart of FIG. 2. Initially pulse sequence electronics 10 feed an excitation signal to transmitter 12, at the same time feeding a start signal coincident with the beginning of the excitation signal to main timer 14. This starts main timer 14. Transmitter 12 responds to the excitation signal to generate a train of pulses at a characteristic frequency. This train of pulses is received at receiver and filters block 18 and is provided to peak detector 20 and negative zero crossing detector 22. Negative zero crossing detector 22 detects each negative-going zero crossing following a positive excursion above the arm level shown in the transmitter output waveform of FIG. 2. In the specific waveform shown in FIG. 2, a zero crossing detector output occurs at the negative-going zero crossing of half cycles 3, 5, 7, and 9.

Each time a half cycle of increased amplitude is received, peak detector 20 responds to store a voltage representative of the increased peak amplitude level and draws current from charge sensor 34. The drawing of current is detected by charge sensor 34. In response, sensor 34 produces output pulses for the purpose of actuating logic means 30 and resetting counter 38. When half cycle 3 occurs, detector 22 and sensor 34 respond to produce pulses at the zero crossing detector and charge sensor outputs. However, in the particular embodiment shown in FIG. 1, logic means 30 requires a pulse from data gate 28 as well, so counter 38 is not started in response to half cycle 3.

The data gate output occurs a delayed time after each negative-going zero crossing following a pulse exceeding the arm level. In half cycle 1 of the transmitter output had exceeded the arm level, the counter would have been started by half cycle 3 since a data gate output would have occured coincident with the charge sensor output pulse and a zero crossing detector output pulse corresponding to that half cycle. In that event, however, the counter would have been reset before it reached capacity by a counter reset pulse generated by charge sensor 34 in response to the increased amplitude of half cycle 5.

Returning to a discussion of the example shown in the timing chart, the half cycle 5 of transmitter output results in coincident charge sensor output, data gate output, and zero crossing detector output pulses. Logic means 30 responds to these pulses to start counter 38. Counter 38 runs for a time equal to approximately 0.8 period of the transmitter signal. Since half cycle 7 of receiver output is of lesser amplitude than half cycle 5, peak detector 20 detects no increased amplitude and charge sensor 34 has no output pulses either to AND gate 30 or to the reset input of counter 38. Therefore, counter 38 is not reset and reaches capacity after time $t_0$, generating an overflow pulse or timing signal at its output 40. This overflow pulse is used to stop the main timer 14 and provide a signal indicative of the transmission time for the signal between transmitter 12 and receiver and filters 18. It will be understood by those of skill in the art that the time stored at main timer 14 will be equal to the transmission time plus the time $t_1$ between the beginning of the excitation signal and the negative-going zero crossing of half cycle 5, and $t_0$, the capacity of counter 38. These are repeatable predetermined times which can be subtracted from the measured time stored in main timer 14. In addition, further accuracy may be achieved by calculating switching times through the elements between receiver and filters 18 and transmission means 42 and subtracting these times from the time measured by main timer 14.

It will also be apparent that the system could be operable without a charge sensor output pulse into logic gate 30. The advantage of such structure is that it eliminates the need for additional circuitry to keep counter 38 from restarting on half cycles subsequent to the largest amplitude half cycle. For example, if two input logic gates were used in place of logic gate 30 and zero crossing detector output pulse and data gate output pulses were the only pulses applied to the logic gate, half cycles 7 and 9 would each restart the counter. However, detrimental results of restart may be handled by protective circuitry between counter output 40 and main timer 14 in the form of logic which rejects additional counter overflow pulses.

Furthermore, although data gate 28 is an element in the specific embodiment of the invention shown in FIG. 1, its presence is not essential to pulse detection with the invention if the environment in which the system is used is sufficiently free from noise. As previously mentioned, the function of data gate 28 is to provide noise rejection by ensuring that counter 38 will not start except in a small time period surrounding what should be a negative-going zero crossing of the signal from transmitter 12.

Figure 3:
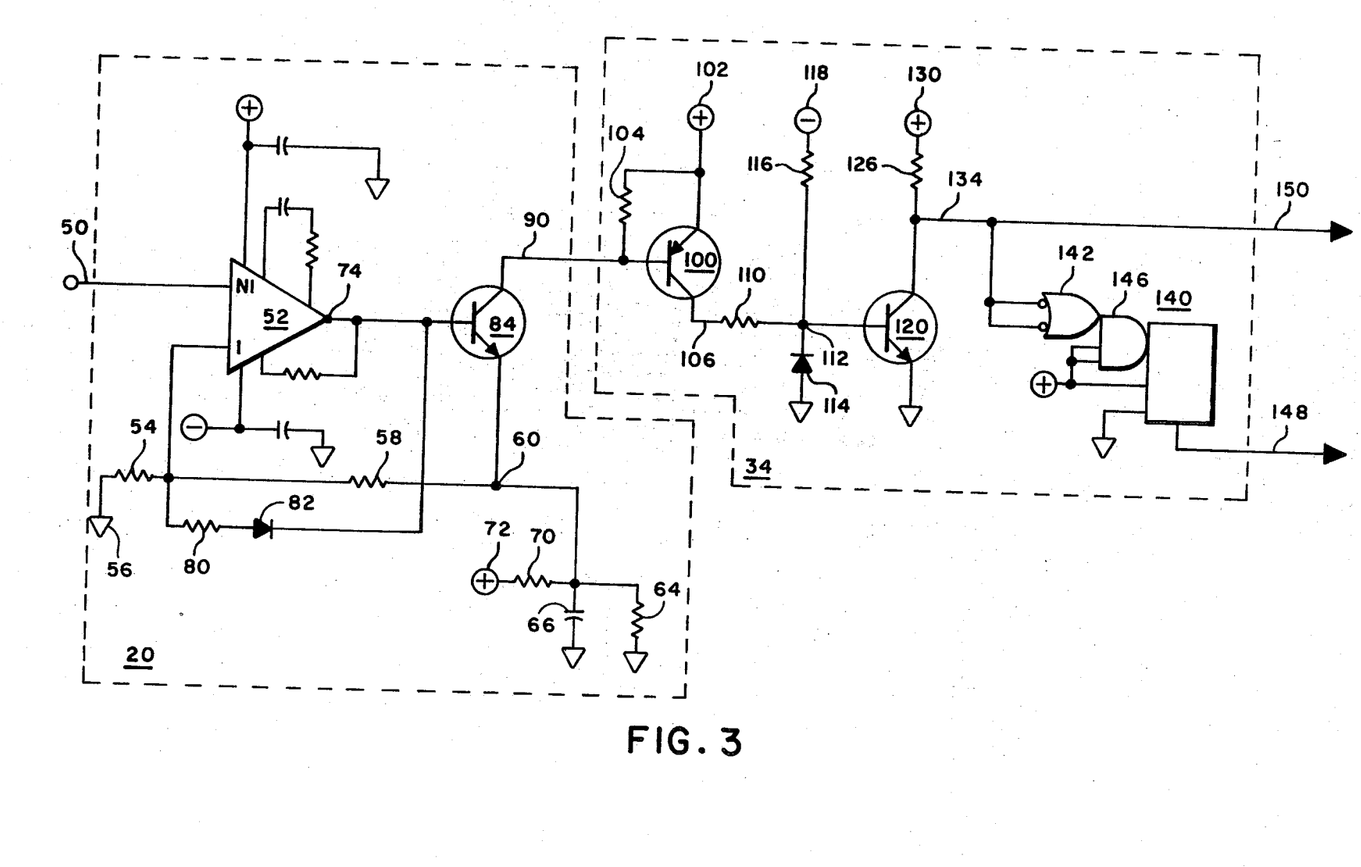
FIG. 3 is a schematic diagram illustrating specific embodiments of the peak detector and charge sensor elements shown in FIG. 1.

FIG. 3 shows circuitry which may be used in a specific embodiment of the pulse detection system as peak detector and charge sensor elements. In FIG. 3 an input terminal 50 is connected to a non-inverting input of an operational amplifier 52. Connected to the inverting input of amplifier 52 is one end of a resistor 54 the other end of which is connected to a ground 56. Also connected to the inverting input of amplifier 52 is one end of a resistor 58 the other end of which is connected to a junction point 60. Connected between junction point 60 and ground in parallel are a resistor 64 and a capacitor 66. Further connected to junction point 60 is one end of a resistor 70 the other end of which is connected to a positive power source 72.

Amplifier 52 has an output 74. Connected between output 74 of amplifier 52 and its inverting input is a resistor 80 in series with a diode 82. Also connected to output 74 is the base of a transistor switch generally designated 84, the emitter of which is connected to junction point 60. The collector of transistor switch 84 is labelled 90. The circuitry between elements 50 and 90 is enclosed in a dashed line box labelled 20 which identifies the described circuitry as a specific embodiment of a peak detector element.

Collector 90 of transistor switch 84 is connected to the base of a second transistor switch 100. A source of positive voltage 102 is connected to an emitter of transistor switch 100 and a biasing resistor 104 is connected between emitter and base of transistor switch 100. A collector 106 of transistor switch 100 is connected to one end of a resistor 110 the other end of which is connected to a junction point 112. Also connected to junction point 112 is the cathode of a diode 114, the anode of which is connected to ground. Further connected to junction point 112 is a resistor 116 the other end of which is connected to a negative power source 118.

A transistor switch 120 also has its base connected to junction point 112. Th emitter of transistor switch 120 is connected to ground. The collector of transistor switch 120 is connected through a resistor 126 to a positive power source 130. The collector of transistor switch 120 is also connected to a connective link 134.

Connective link 134 provides a signal to a one shot multivibrator arrangement generally designated 140. One shot multivibrator arrangement 140 includes a NOR gate 142 and AND gate 146 which process the input waveform to allow the multi-vibrator to trigger in response to negative-going waveforms. One shot multivibrator 140 shapes and provides output pulses of a controlled width in response to negative-going excursions of the signal present on connective link 134. One shot multi-vibrator 140 has an output labelled 148 at which pulses for transmission to logic means 30 are provided. In addition the signal on link 134 is provided to an output 150 for transmission to a second similar one shot multivibrator (not shown) which generates reset pulses for transmission to reset input of counter 38.

In operation, the received and processed transmitter signal from receiver and filters 18 is provided to input terminal 50. A voltage level established by positive power source 72 in conjunction with resistors 54, 58, 70 and 64 establishes a threshold or arm level which must be overcome by the signal on input terminal 50 before a state change will occur at output 74. Referring to the timing chart of FIG. 2, the second waveform shows that half cycle 3 is the first half cycle in which the arm level is exceeded. When the arm level is exceeded output 74 goes high. This high level turns on transistor switch 84 and charges resistor-capacitor pair 64, 66 by drawing current from positive power source 102 through transistor 84 and transistor 100. The current drawn through transistor 84 charges capacitor 66 and provides a higher threshold level at the inverting input to amplifier 52. This level must be exceeded by the next half cycle at input 50 in order to further charge capacitor 66. Each time transistor 100 is turned on, current from positive power source 102 flows through resistor 110 and provides a base current for transistor 120. This turns on transistor 120 and causes a voltage drop at connective link 134.

The voltage drop on link 134 is provided to one shot multivibrator 140 to produce a pulse for output 148 and is sent via output 150 to a one shot multivibrator (not shown) to create a pulse of different width for use in resetting counter 38.

Figure 4:
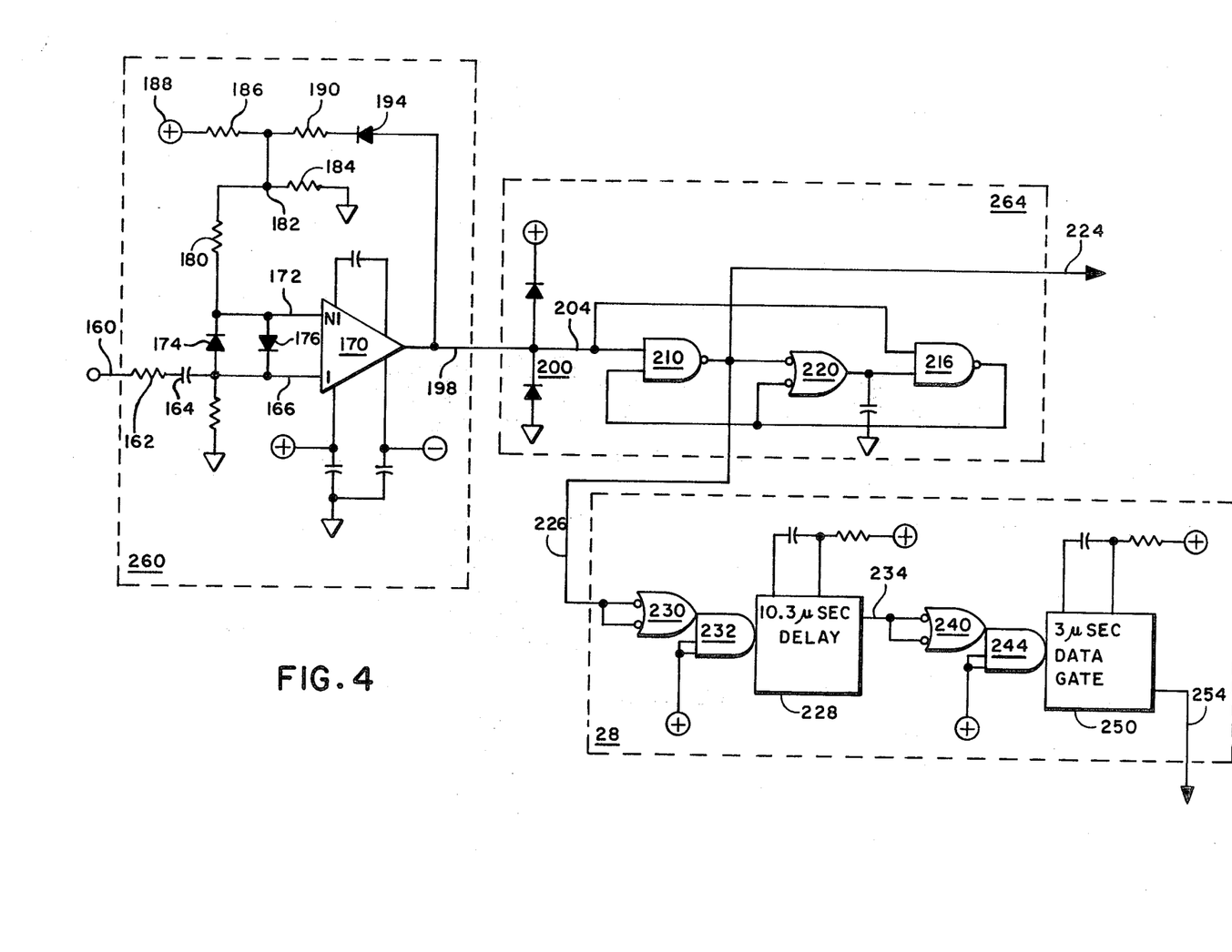
FIG. 4 is a schematic diagram illustrating specific embodiments of the negative zero crossing detector and data gate elements shown in FIG. 1 in block diagram form.

Referring now to FIG. 4, a specific embodiment of a negative zero crossing detector 22 and data gate 28 is shown. In FIG. 4, an input terminal 160 is connected to one end of a resistor 162 the other end of which is connected to a capacitor 164. Capacitor 164 is in turn connected to an inverting input 166 of an operational amplifier 170. Operational amplifier 170 has a second non-inverting input 172. A diode 174 has its anode connected to input 166 and its cathode connected to input 172. A second diode 176 has its anode connected to input 172 and its cathode connected to input 166. Also connected to input 172 is one end of a resistor 180 the other end of which is connected to a junction point 182.

Connected to junction point 182 is one end of a resistor 184 the other end of which is grounded. Also connected to junction point 182 is a resistor 186 the other end of which is connected to a positive power source 188. Further connected to junction point 182 is one end of a resistor 190 the other end of which is connected to the cathode of a diode 194. The anode of diode 194 is connected to the output of operational amplifier 170 and provides a feedback loop therefore. The output of amplifier 170 is designated 198. Output 198 is connected through a current limiting resistor (not shown) to a level translator generally designated 200 which changes the excursions of voltage to a level more easily handled by conventional digital logic in a manner well known to those of skill in the art.

The signal with the new level appears on an input 204 and is transmitted through a conventional differentiating circuit made up of NAND gates 210 and 216 and NOR gate 220. A differentiator so constructed is well known in the art and its circuitry and operation will not be described in detail. Suffice it to say that it produces narrow pulses in response to positive-going excursion of the signal it receives. These pulses, which constitute the negative zero crossing detector output shown in the timing chart of FIG. 2 are provided on an output labelled 224 in FIG. 4.

These same pulses are provided through a connection 226 as an input to a one shot multivibrator 228 via input processing NOR gate 230 and AND gate 232. In response to each pulse, one shot multi-vibrator 228 produces, at an output 234, a pulse of predetermined width. The trailing edge of the pulse from output 234 is processed by an input NOR gate 240 and AND gate 244 and is used to trigger a second one shot multivibrator 250. One shot multivibrator 250 has an output 254 at which a pulse described as an "data gate output pulse" in connection with FIG. 2 appears. The predetermined width of the output pulse from multivibrator 228 is selected so that each data gate output pulse will be delayed and centered in time one period of the transmitter signal from the zero crossing detector output pulse which initiates it.

To aid in understanding, consider a specific example of the pulse detection system in which transmitter 12 has a natural frequency of 75 kilohertz. In that case the period of the transmitter signal is 11.8 μ-seconds. If a data gate output pulse of 3.0 μ-second width were desired for the system, a 10.3 μ-second delay would be necessary in order to center the pulses one period from the zero crossing detector output pulses. Multivibrators 228 and 250 are marked with these pulse widths for illustrative purposes.

Three dashed line boxes appear in FIG. 4. A first box labelled 260 identifies a trigger circuit which produces a trigger output shown as a third waveform in the timing chart of FIG. 2. The second block labelled 264 shows a differentiator and level translator which result in the zero crossing detector output shown as the fourth waveform in the timing chart of FIG. 2. Trigger circuit 260 and differentiator 264 together function as a negative-going zero crossing detector of the type identified as element 22 in FIG. 1. Finally, a box labelled 28 represents the data gate element shown in FIG. 1 and produces an output identified as "data gate output" in FIG. 2.

During operation of the negative-going zero crossing detector and data gate shown in FIG. 4, a signal similar to the transmitter output signal in FIG. 2 will be transmitted to input terminal 160. This signal will be filtered by resistor 162 and capacitor 164 and provided to input 166 of the amplifier 170. Power source 188 in combination with resistors 180, 184, 186, and 190 effectively sets an arm level for amplifier 170, which arm level may be the same as that initially established for peak detector 20 shown in FIG. 3. Until this voltage is exceeded by the receiver output in half cycle 3, the trigger output will remain high. Once the barrier established at junction point 182 is overcome by the input voltage, the trigger output will go low. The trigger output will remain low until the input falls to zero indicating a zero crossing. At that time the trigger output will again go high. The result is a signal similar to the "trigger output" waveform shown in FIG. 2. The voltage level of the trigger element output 198 is altered by level translator 200 and the signal is processed by differentiator 264 to produce, on output 224, a waveform of the type identified as a "zero crossing detector output" waveform in FIG. 2. This zero crossing detector output is fed via connective link 226 to multivibrator 228. The output pulses from multivibrator 228 actuate multi-vibrator 250 to produce time delayed pulses of the form identified as a "data gate output" in FIG. 2. This waveform is transmitted via output 254 to logic means 30 which generates start pulses for the counter 38.

Specific elements making up the counter 38 and main timer 14 will not be described herein since conventional counters and timing circuits well known to those of skill in the art may be used to fulfill these functions.

It is apparent from the foregoing description that there has been provided, in accordance with the invention, a pulse detection system which fully satisfies the objects, aims, and advantages set forth above. The invention has been described in conjunction with specific embodiments of the system and its elements, but many alternatives, modifications, and variations will be apparent to those skilled in the art in light of the foregoing description. Accordingly, the subject matter embraced includes all such alternatives, modifications, and variations which fall within the spirit and broad scope of the appended claims.

What is claimed is:

1. Apparatus for producing an output signal whenever the pulse with the largest amplitude level in a series of pulses separated successively by at least a predetermined time interval crosses a reference level, comprising in combination:

a. detection means for producing a first signal whenever any pulse in the series crosses a predetermined reference level;

b. reset means producing a second signal whenever a received pulse has a peak level exceeding that of the previously received pulses;

c. logic means connected to receive said first and second signals and responsive to simultaneous existence of the signals to generate a third signal; and d. counter means responsive to the third and second signals for producing an output signal whenever the third signal is not followed by the second signal within the predetermined time interval between successive pulses.

2. The apparatus of claim 1 wherein said reset means further includes peak detection means for continuously generating a signal representative of the amplitude of the highest amplitude pulse received and a charge sensor associated with said peak detection means and operable to sense increases in magnitude of the signal stored by said peak detection means and to generate a reset pulse each time the signal so stored increases in magnitude.

3. The apparatus of claim 2 wherein said peak detection means includes a capacitor connected to be charged in response to the amplitude of pulses received and said charge sensor includes a monitored current source which supplies current for charging said capacitor and produces an output pulse each time current is supplied.

4. The apparatus of claim 1 further including data gate means responsive to said first signal to generate a gating pulse a predetermined time period after each occurence of said first signal, and wherein said logic means is also responsive to said gating pulses to provide a start signal for said counter only if said first and second signals and one of said gating signals simultaneously exist.

5. The apparatus of claim 3 wherein said logic means is further responsive to said output pulses from said monitored current source to provide a start signal for said counter only if one of said output pulses coexists with one of said first signals.

6. Apparatus for precisely measuring the transmission time of a signal between first and second points in a transmission medium, comprising:

a. first means for producing at the first point a signal comprised of a series of pulses, one of which has an amplitude substantially greater than that of the others, and transmitting said pulsed signal through the medium;

b. a receiver, positioned at the second point, for receiving said pulsed signal and generating an output signal representative thereof;

c. a zero-crossing detector responsive to said receiver output signal to detect crossings of the magnitude of said received output signal through a predetermined reference level and to generate output pulses indicative of said crossings; d. a peak detector responsive to the amplitude of each of said series of pulses to detect whether a pulse received has an amplitude substantially greater than a previous pulse and to produce output pulses indicative of such detection;

e. a counter, having start and reset inputs and an output, said counter producing a timing signal at a predetermined time after being started;

f. a logic gate having first and second inputs at which said zero-crossing detector output pulses and peak detector output pulses are received, and an output at which a logic signal is produced in response to coexistent signals at said first and second inputs;

g. means for supplying said logic signal to the start input of said counter for starting thereof;

h. means for supplying said peak detector output pulses to the reset input of said counter; and i. a timer actuated by said first means to start timing at a predetermined time with respect to the production of said first means signal and responsive to said counter overflow pulse to stop timing, whereby a time period indicative of the transmission time for said first means signal between said first and second points is measured.

7. The apparatus of claim 6 further including data gate means associated with said zero-crossing detector and responsive to output pulses therefrom to generate a gating pulse a predetermined time after each of said zero-crossing detector output pulses are produced; and wherein said logic gate has a third input adapted to receive said gating pulses, and said logic signal is produced in response to coexistent signals at said first, second and third inputs.

8. The apparatus of claim 7 wherein said logic gate comprises a three input NAND gate.

9. The apparatus of claim 7 wherein said logic gate comprises a three input AND gate.

* * * * *